United States Patent [19]

Parton et al.

[11] Patent Number: 5,061,618
[45] Date of Patent: Oct. 29, 1991

[54] INFRARED-SENSITIVE PHOTOGRAPHIC ELEMENT

[75] Inventors: Richard L. Parton, Webster; Annabel A. Muenter, Rochester; David A. Stegman, Churchville, all of N.Y.

[73] Assignee: Eastman Kodak Company, Rochester, N.Y.

[21] Appl. No.: 500,360

[22] Filed: Mar. 28, 1990

Related U.S. Application Data

[63] Continuation-in-part of Ser. No. 412,379, Sep. 26, 1989, abandoned.

[51] Int. Cl.$^5$ .................... G03C 1/20; G03C 1/28
[52] U.S. Cl. .................... 430/584; 430/502; 430/503; 430/506; 430/508; 430/572; 430/573; 430/576; 430/578; 430/581; 430/944
[58] Field of Search .............. 430/944, 584, 578, 572, 430/573, 576, 502, 503, 506, 508, 581

[56] References Cited

U.S. PATENT DOCUMENTS

| | | | |
|---|---|---|---|
| 2,955,939 | 10/1960 | Brooker et al. | 430/578 |
| 4,515,888 | 5/1985 | Beretta et al. | 430/584 |
| 4,536,473 | 8/1985 | Mihara | 430/575 |
| 4,619,892 | 1/1989 | Simpson et al. | 430/505 |
| 4,801,525 | 1/1989 | Mihara et al. | 430/518 |
| 4,917,997 | 4/1990 | Ikeda et al. | 430/572 |
| 4,965,182 | 10/1990 | Mihara | 430/576 |

FOREIGN PATENT DOCUMENTS 0288261 10/1988 European Pat. Off. .
3720138 1/1988 Fed. Rep. of Germany .

OTHER PUBLICATIONS

Y. L. Slominski et al., UKR Khim Zh. No. 6 vol. 40, pp. 625–629 (1974) Tricarbocyanines with Hydrocarbon Rings in the Chromophore.
Y. L. Slominski et al., Zh, Org. Khim. No. 2 vol. 15, pp. 400–407 (1979) Polymethine Dyes with Hydrocarbon Bridges Effect of Substituents in the Chromophore on the Color of Tricarbocyanines.

*Primary Examiner*—Charles L. Bowers, Jr.
*Assistant Examiner*—Janis L. Dote
*Attorney, Agent, or Firm*—Andrew J. Anderson

[57] ABSTRACT

A photographic element is described comprising a support having thereon a silver halide emulsion layer where the silver halide is sensitized with a dye having the formula:

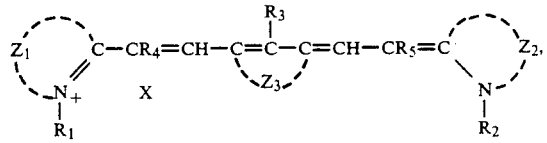

wherein where $Z_1$, $Z_2$, $Z_3$, $R_1$, $R_2$, $R_3$, $R_4$, $R_5$, and X are as defined herein.

9 Claims, No Drawings

INFRARED-SENSITIVE PHOTOGRAPHIC ELEMENT

This application is a continuation in part of applipation Ser. No. 412,379, filed Sept. 26, 1989, now abandoned.

FIELD OF THE INVENTION

This invention relates to photography and specifically to silver halide photographic elements sensitive to infrared radiation.

BACKGROUND OF THE INVENTION

Silver halide photography usually involves the exposure of silver halide with light in order to form a latent image that is developed during photographic processing to form a visible image. Silver halide is intrinsically sensitive only to light in the blue region of the spectrum. Thus, when silver halide is to be exposed to other wavelengths of radiation, such as green or red light in a multicolor element or infrared radiation in an infrared sensitive element, a spectral sensitizing dye is required. Sensitizing dyes are chromophoric compounds (usually cyanine dye compounds) that are adsorbed to the silver halide. They absorb light or radiation of a particular wavelength and transfer the energy to the silver halide to form the latent image, thus effectively rendering the silver halide sensitive to radiation of a wavelength other than the blue intrinsic sensitivity.

The advent of solid state diodes that emit an infrared laser beam has expanded the useful applications of infrared-sensitive photographic elements. These include making prints from computer assisted tomography scanners, various graphic arts products that are exposed by diode lasers, and infrared-sensitive false color-sensitized photographic materials as described in U.S. Pat. No. 4,619,892 of Simpson et al.

Dyes for sensitizing silver halide to infrared radiation have been known for some time. The most common infrared sensitizing dyes are tricarbocyanine dyes, for example, those described in U.S. Pat. No. 4,536,473. Many prior art infrared sensitizing dyes, however, are of limited utility for use in an element that is to be exposed to an infrared laser diode. Some dyes exhibit a broad absorbance spectrum, giving the silver halide unwanted sensitivity in regions of the spectrum other than the emission wavelength of the laser diode. This can result in poor image separation (or color seParation) between the layers of an element having multiple infrared-sensitive layers, such as a false color-sensitized material as described in U.S. Pat. No. 4,619,892. Some dyes do not absorb at a deep enough wavelength to impart good photographic speed at the emission wavelength of the laser, which can range up to 900 nm, or, if they do, exhibit an undesirably broad spectral absorption. Another problem with many known infrared sensitizing dyes is the poor stability of the sensitized silver halide emulsion during keeping. Therefore, it would be desirable to provide sensitizing dyes for silver halide that offer deep and narrow sensitization in the infrared with good keeping stability.

SUMMARY OF THE INVENTION

According to the present invention there is provided a photographic element of a support having thereon a silver halide emulsion layer sensitized with a dye having the formula:

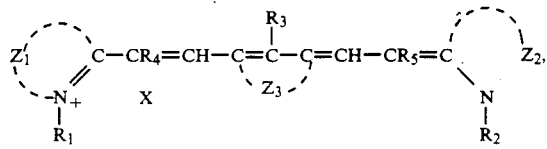

wherein $Z_1$ and $Z_2$ each independently represents the atoms necessary to complete a substituted or unsubstituted thiazole nucleus, a substituted or unsubstituted oxazole nucleus, a substituted or unsubstituted selenazole nucleus, a substituted or unsubstituted quinoline nucleus, a substituted or unsubstituted tellurazole nucleus, or a substituted or unsubstituted pyridine nucleus.

$Z_3$ represents the atoms that complete a 5- or 6-membered carbocyclic ring, $R_1$ represents substituted or unsubstituted alkyl, substituted or unsubstituted aryl, or, together with $R_4$, forms a ring structure, $R_2$ represents substituted or unsubstituted alkyl, substituted or unsubstituted aryl, or, together with $R_5$, forms a ring structure, $R_3$ represents hydrogen, substituted or unsubstituted alkyl, substituted or unsubstituted aryl, or a substituted or unsubstituted heterocyclic or carbocyclic ring wherein said ring does not have a heteroatom attached directly to the methine chain carbon atom of the dye and does not have a carbonyl in the beta position to the methine chain carbon atom of the dye, $R_4$ represents hydrogen or, together with $R_1$, forms a ring structure, $R_5$ represents hydrogen or, together with $R_2$, forms a ring structure, and X is a counterion as needed to balance the charge of the molecule.

The dyes of formula (I) effectively sensitize silver halide to infrared radiation. The wavelength range of infrared radiation to which silver halide is sensitized with the dyes of formula (I) is both deeper and narrower than previously known infrared sensitizing dyes.

DESCRIPTION OF THE PREFERRED EMBODIMENT

According to formula (I), $Z_1$ and $Z_2$ each independently represents the atoms necessary to complete a substituted or unsubstituted: thiazole nucleus, oxazole nucleus, selenazole nucleus, pyridine nucleus, tellurazole nucleus, or quinoline nucleus. This nucleus may be substituted with known substituents, such as halogen (e.g., chloro, fluoro, bromo), alkoxy (e.g., methoxy, ethoxy), alkyl, aryl, aralkyl, sulfonate, and others known in the art. Especially preferred is a substituted or unsubstituted: thiazole nucleus, oxazole nucleus, or selenazole nucleus. Substitutents for $Z_1$ and $Z_2$ may be appended to the ring as individual substituents or fused with the heterocyclic ring to form fused ring systems, as is known in the art.

Examples of useful nuclei for $Z_1$ and $Z_2$ include a thiazole nucleus, e.g., thiazole, 4-methylthiazole, 4-phenylthiazole, 5-methylthiazole, 5-phenylthiazole, 4,5-dimethyl thiazole, 4,5-diphenylthiazole, 4-(2-thienyl)-thiazole, benzothiazole, 4-chlorobenzothiazole, 5-chlorobenzothiazole, 6-chlorobenzothiazole, 7-chlorobenzothiazole, 4-methyl benzothiazole, 5-methylbenzothiazole. 6-methylbenzothiazole, 5-bromobenzothiazole. 6-bromobenzothiazole, 5-phenylbenzothiazole. 6-phenylbenzothiazole, 4-methoxybenzothiazole, 5-methoxybenzothiazole, 6-methoxybenzothiazole, 5-iodobenzothiazole. 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, naphtho[2,1-d]thiazole, naptho[1,2-d]thiazole, 5-methoxynaphtho[2,3-d]thiazole, 5-ethoxynaphtho[2,3-d]thiazole, methoxynaphtho[Z,3-d]thiazole, methoxy naphtho[2,3-d]thiazole, 4'-methoxythianaphtheno 7',6'-4,5-thiazole, etc.; an oxazole nucleus, e.g., 4-methyloxazole, methyloxazole, 4-phenyloxazole, 4,5-diphenyloxazole, 4-ethyloxazole, 4,5-dimethyloxazole, 5-phenyloxazole, benzoxazole, chlorobenzoxazole, 5-methylbenzoxazole, phenylbenzoxazole, 6-methylbenzoxazole, 5,6-dimethylbenzoxazole, 4,6-dimethylbenzoxazole ethoxybenzoxazole, 5-chlorobenzoxazole, methoxybenzoxazole, 5-hydroxybenzoxazole, hydroxybenzoxazole,naphtho[2,1-d]oxazole, naphtho[1,2-d]oxazole, etc.; a selenazole nucleus, e.g., 4-methylselenazole, 4-phenylselenazole, benzoselenazole, 5-chlorobenzoselenazole, methoxybenzoselenazole, 5-hydroxybenzoselenazole, tetrahydrobenzoselenazole, naphtho[2,1-d]selenazole, naphtho[1,2-d]selenazole, etc.; a pyridine nucleus, e.g, 2-pyridine, 5-methyl 2-pyridine, 4-pyridine, methyl 4-pyridine, etc.; a quinoline nucleus, e.g., quinoline, 3-methyl 2-quinoline, ethyl 2-quinoline, 6-chloro 2-quinoline, chloro 2-quinoline, 6-methoxy 2-quinoline, ethoxy 2-quinoline, 8-hydroxy 2-quinoline, quinoline, 6-methoxy 4-quinoline, methyl 4-quinoline, 8-chloro 4-quinoline, etc.; and a tellurazole nucleus, e.g., benzotellurazole, naphtho[1,2-d]tellurazole 5,6-dimethoxytellurazole, methoxytellurazole, 5-methyltellurazole.

$Z_3$-represents the atoms that complete a 5- or 6-membered carbocyclic ring, preferably a membered carbocyclic ring. This ring can be substituted, as would be known to one skilled in the art. Examples of substituents include substituted or unsubstituted alkyl (e.g.. methyl. ethyl. propyl, chloroethyl, benzyl), substituted or unsubstituted aryl (e.g., phenyl, p-chlorophenyl), halogen (e.g., chloro, fluoro), hydroxy, alkoxy (e.g., methoxy, ethoxy), and others that would be apparent to one skilled in the art.

$R_1$ and $R_2$ may be substituted or unsubstituted aryl (preferably of 6 to 15 carbon atoms), or more preferably, substituted or unsubstituted alkyl (preferably of from 1 to 6 carbon atoms). Examples of aryl include phenyl, tolyl, p-chlorophenyl. and p-methoxyphenyl. Examples of alkyl include methyl, ethyl, propyl, isopropyl, butyl, hexyl, cyclohexyl, decyl, dodecyl, etc., and substituted alkyl groups (preferably a substituted lower alkyl containing from 1 to 6 carbon atoms), such as a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc.; a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxbutyl, etc., an alkoxycarbonylalkyl group, e.g., β-methoxycarbonylethyl, ω-ethoxycarbcnylbutyl, etc., or an aralkyl group, e.g., benzyl, phenethyl, etc. The alkyl group may be substituted by one or more of the substituents on the above-described substituted alkyl groups.

$R_3$ represents hydrogen, substituted or unsubstituted alkyl, substituted or unsubstituted aryl, or a substituted or unsubstituted heterocyclic or carbocyclic ring wherein said ring does not have a heteroatom attached directly to the methine chain carbon atom of the dye or a carbonyl in the beta position to the methine chain carbon atom of the dye. Dyes having the carbonyl in the beta position form a complex merocyanine/cyanine dye structure that is not useful according to the present invention, as demonstrated in the Examples below. Examples of aryl groups useful as $R_3$ include phenyl, tolyl, naphthyl, methoxyphenyl, chlorophenyl, and the like. Examples of unsubstituted alkyl groups useful as $R_3$ include the unsubstituted alkyls described above for $R_1$ and $R_2$. Examples of substituents for alkyl groups are known in the art, e.g., alkoxy and halogen. Examples of substituted or unsubstituted heterocyclic or carbocyclic rings useful as $R_3$ include 4-pyridyl, 3-pyridyl, 2-thienyl, 3-thienyl,

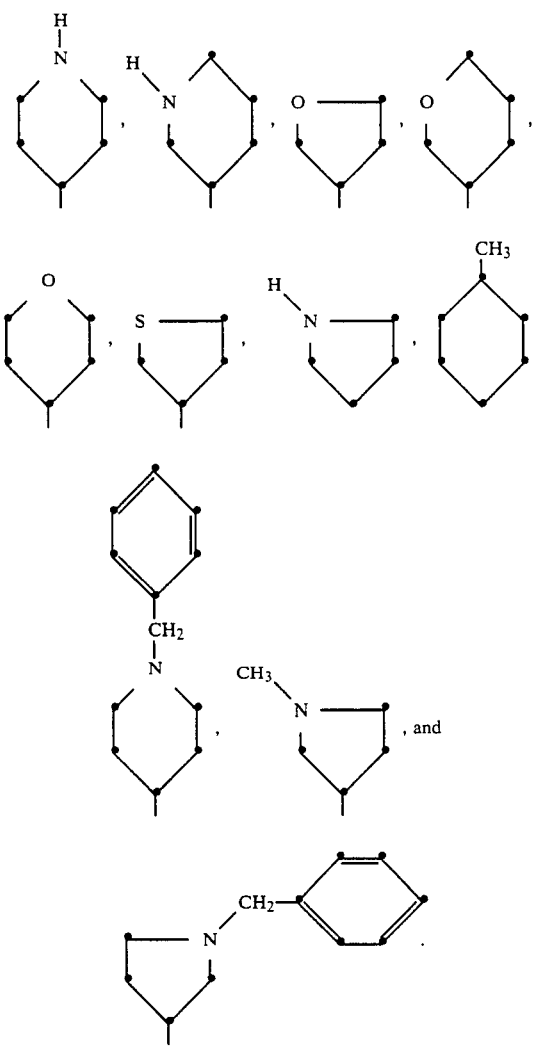

$R_4$ and $R_5$ can each independently represent hydrogen or, together with $R_1$ and $R_2$, respectively, can form a ring structure. This structure, which is fused with the $Z_1$ and $Z_2$ ring structures, can have 5 or 6 members, but is preferably a 6-membered ring.

X represents a counterion as necessary to balance the charge of the dye molecule. The counterion may be ionically complexed to the molecule or it may be part of the dye molecule itself to form an intramolecular salt.

Such counterions are well-known in the art. For example, when X is an anion (e.g., when $R_1$ and $R_2$ are unsubstituted alkyl), examples of X include chloride, bromide, iodide, p-toluene sulfonate, methane sulfonate, methyl sulfate, ethyl sulfate, perchlorate, and the like. When X is a cation (e.g., when $R_1$ and $R_2$ are both sulfoalkyl or carboxyalkyl), examples of X include sodium, potassium, triethylammonium, and the like.

Examples of dyes according to formula (I) are set forth below. Many of these dyes, in addition to offering the above-described advantages of narrow sensitization deep in the infrared, can also exhibit good safelight performance in that they have low sensitivity to green light.

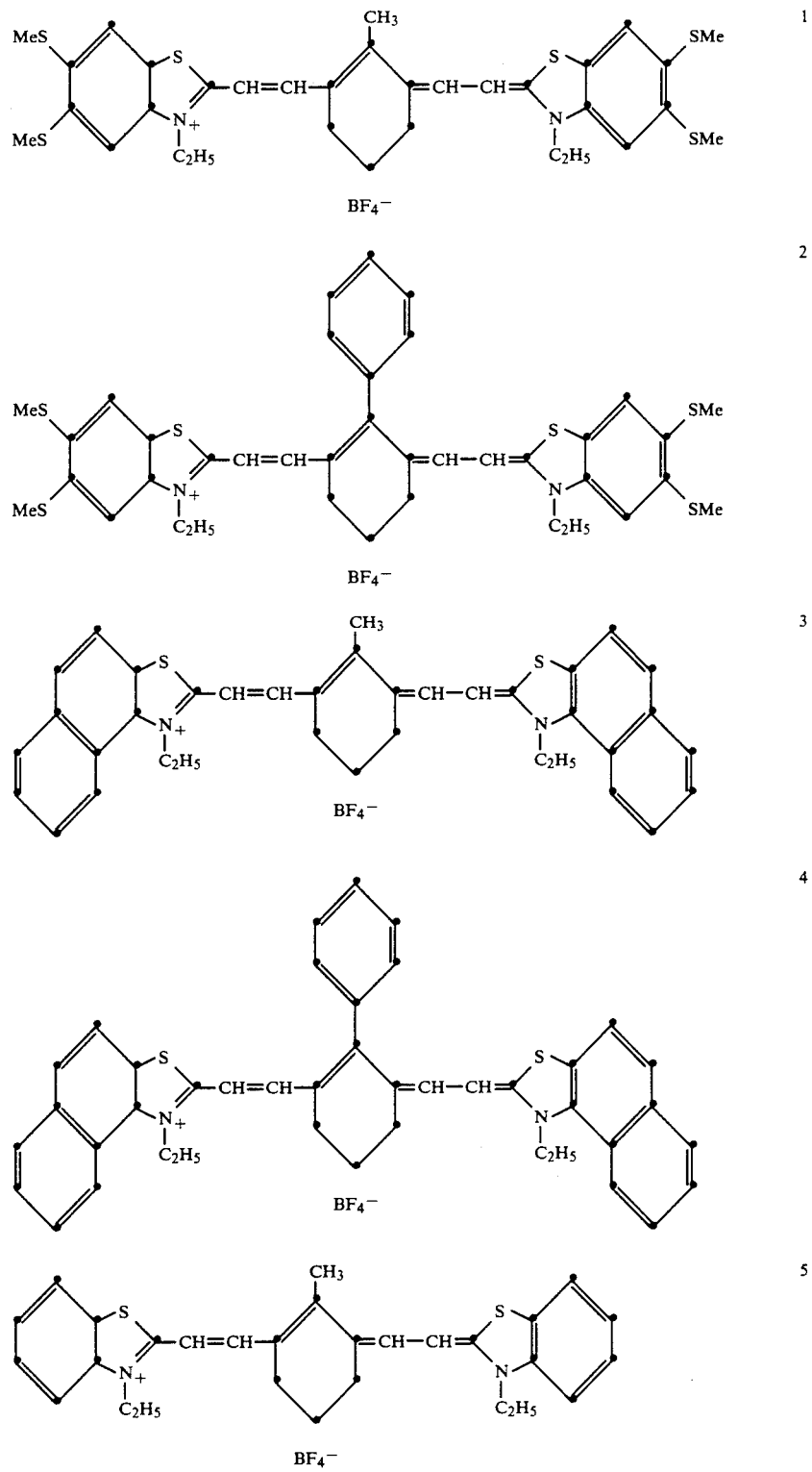

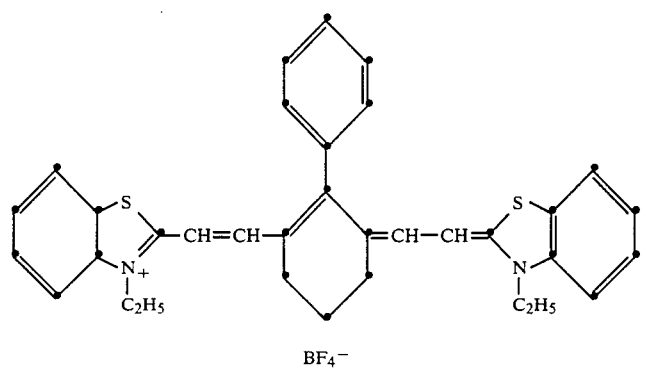
6
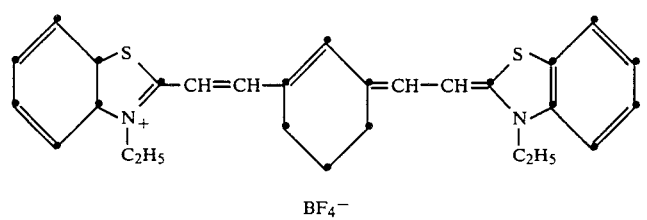
7
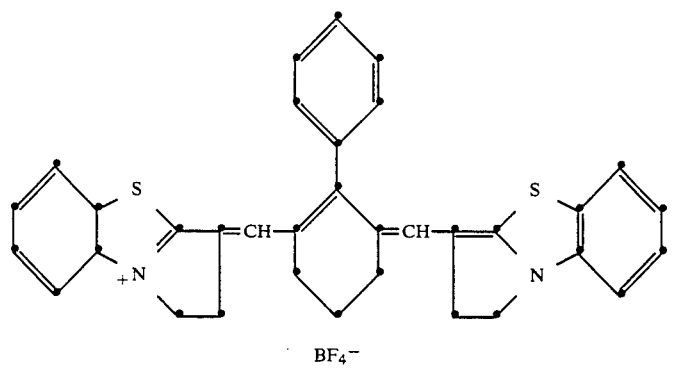
8
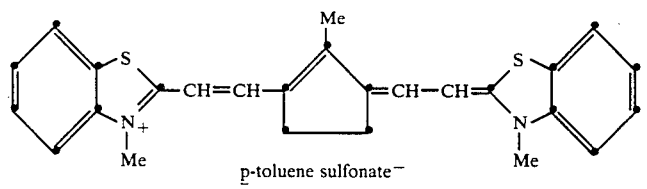
9
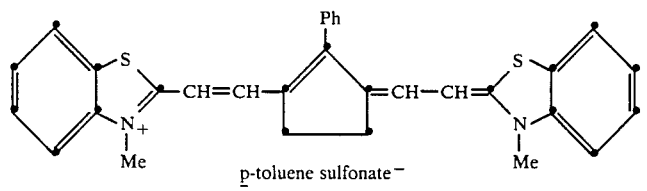
10
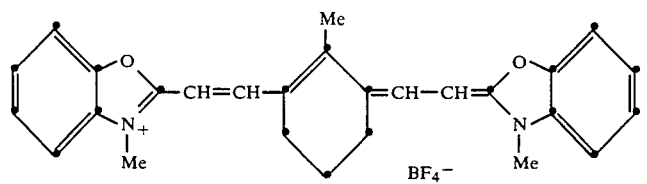
11

-continued
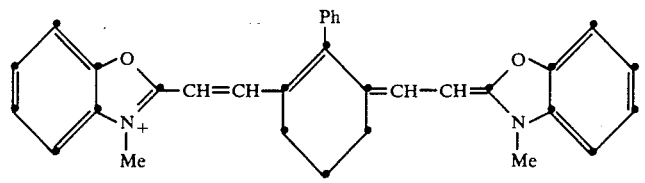
12
CF₃SO₃⁻
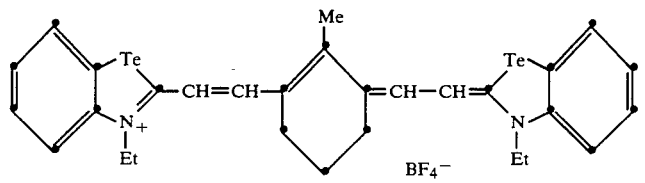
13
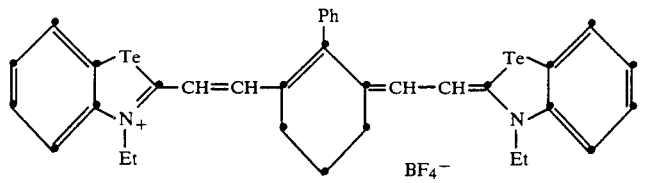
14
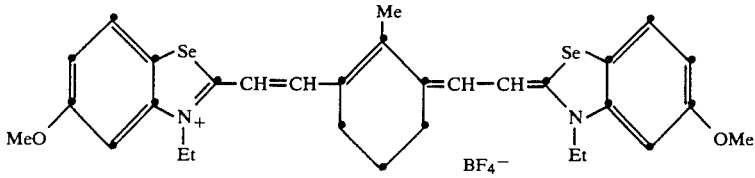
15
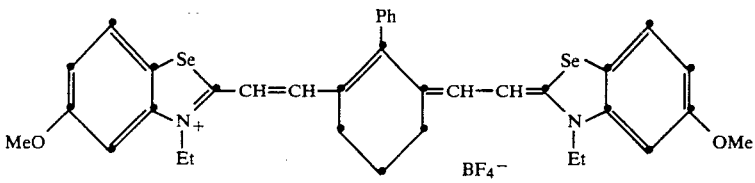
16
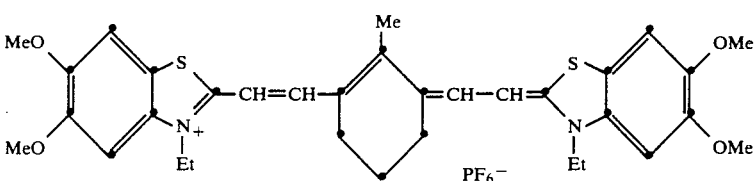
17
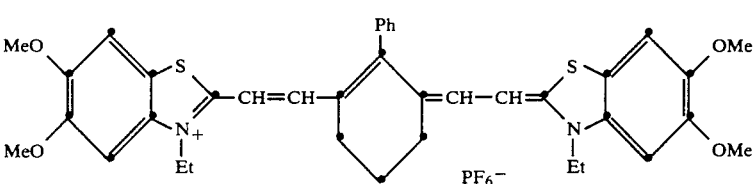
18
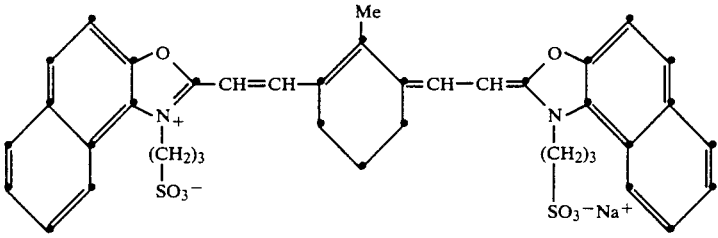
19

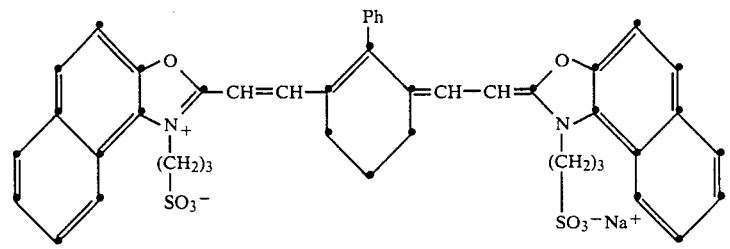
20
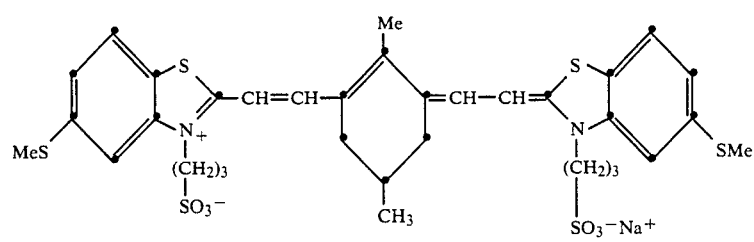
21
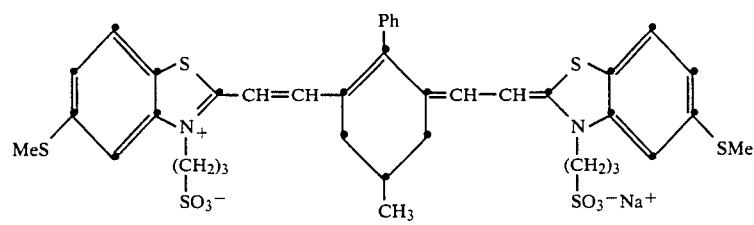
22
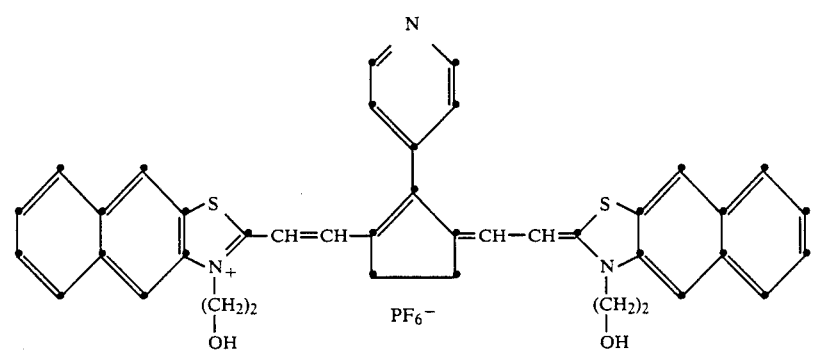
23
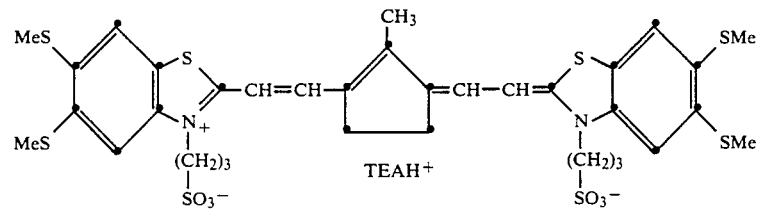
24
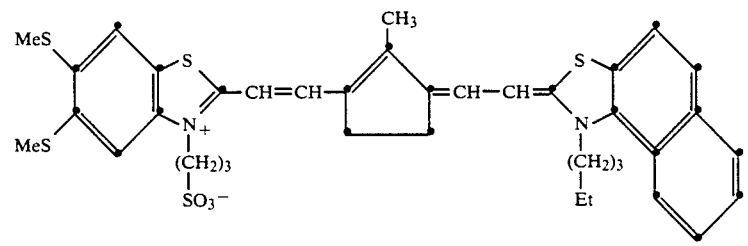
25

-continued

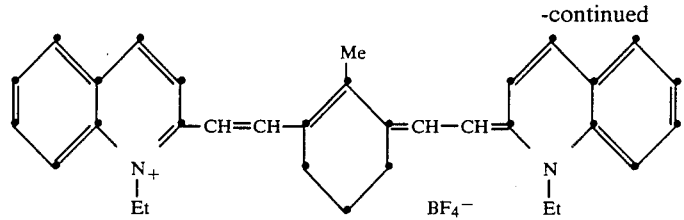

26

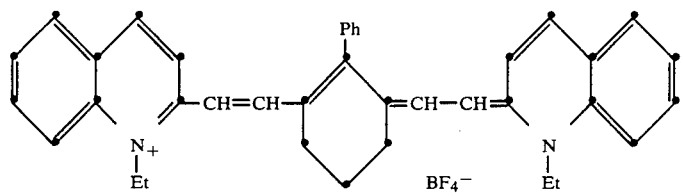

27

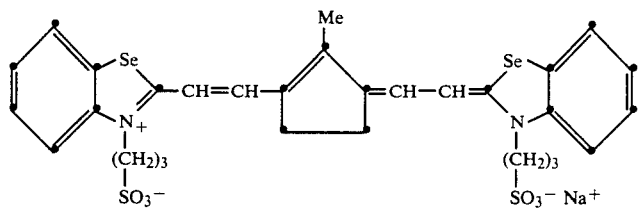

28

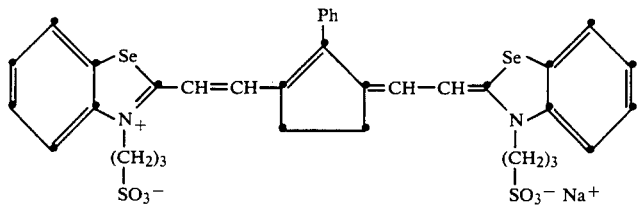

29

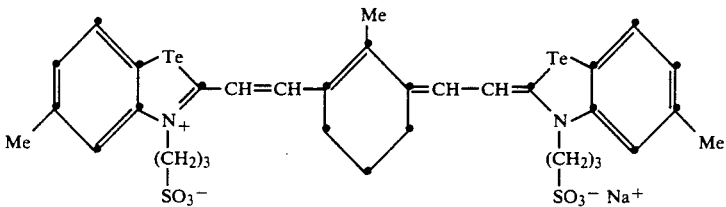

30

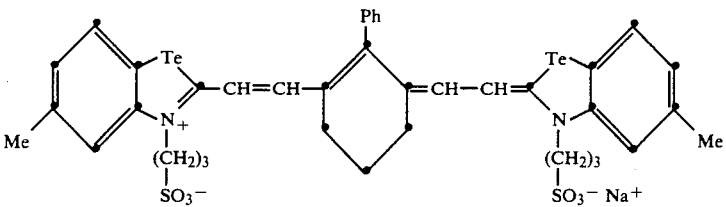

31

Tricarbocyanine dyes and their methods of synthesis are well-known in the art. Synthetic techniques for these known dyes, such as described in U.S. Pat. No. 2,734,900 or Hamer, Cyanine Dyes and Related Compounds, John Wiley & Sons, 1964, apply equally as well to the dyes of formula (I). Techniques for synthesis of the dyes of formula (I) are described by Y. L. Slominskii & L. M. Shulezhko, UKR. Khim. Zh., 40, 625-629 (1974) and U. L. Slominskii et al, Zh. Org. Khim., 15, 400 (1979), the disclosures of which is incorporated herein by reference.

The dyes of formula (I) are advantageously used to sensitize photographic silver halide emulsions to infrared radiation. These silver halide emulsions can contain grains of any of the known silver halides, such as silver bromide, silver chloride, silver bromoiodide, and the like, or mixtures thereof, as described in Research Disclosure, Item 17643, December, 1978 [hereinafter referred to as Research Disclosure I], Section I. The silver halide grains may be of any known type, such as spherical, cubic, or tabular grains, as described in Research Disclosure I, Section I or Research Disclosure, Item 22534, January, 1983.

In a preferred embodiment, the dyes of formula (I) are used to spectrally sensitize to infrared radiation a silver halide emulsion layer in a photographic element that includes at least one other infrared-sensitive silver halide layer.

The silver halide emulsions generally include a hydrophilic vehicle for coating the emulsion as a layer of a photographic element. Useful vehicles include both naturally-occurring substances such as proteins, protein derivatives, cellulose derivatives (e.g., cellulose esters), gelatin (e.g., alkali treated gelatin such as cattle bone or hide gelatin, or acid treated gelatin such as pigskin gelatin), gelatin derivatives (e.g., acetylated gelatin, phthalated gelatin, and the like), and others described in *Research Disclosure I*. Also useful as vehicles or vehicle extenders are hydrophilic water permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, Polyamides, polyvinyl pyridine, methacrylamide copolymers, and the like, as described in *Research Disclosure I*. The vehicle can be present in the emulsion in any amount known to be useful in photographic emulsions.

In a preferred embodiment, the silver halide emulsion sensitized with a dye of formula (I) also contains a bis-azine compound. The bis-azines useful in the invention are well-known in the art (usually as supersensitizers for red- or infrared- sensitive silver halide emulsions). They include those according to the formula:

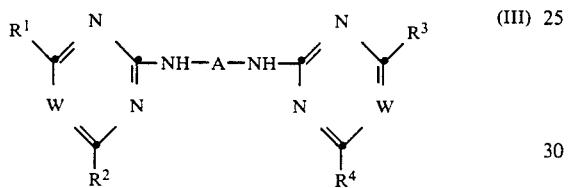
(III)

According to formula (III), W represents nitrogen or $-CR^5=$ where $R^5$ is hydrogen, halogen (e.g., chloro, bromo. etc.). or alkyl (preferably of from 1 to 4 carbon atoms, e.g., methyl, ethyl, etc.). $R^1$, $R_2$, $R_3$, and $R_4$ each independently represents hydrogen, hydroxy, alkoxy (preferably having from 1 to 10 carbon atoms, e.g., methoxy, ethoxy, propoxy, etc.), alkyl (preferably having from 1 to 10 carbon atoms, e.g., methyl, ethyl, n-butyl, isopropyl, etc.), an aryloxy group (e.g., phenoxy, o-tolyloxy, p-sulfophenoxy, etc.), a halogen atom (e.g., chlorine, bromine, etc.), a heterocyclic nucleus (e.g., morpholinyl, piperidyl, etc.), an alkylthio group (wherein the alkyl moiety preferably has from 1 to 10 carbon atoms, e.g., methylthio, ethylthio, etc.), a heterocyclothio group (e.g., benzothiazolylthio, etc.), an arylthio group (e.g., phenylthio, tolylthio, etc.), an amino group, an alkylamino group, which term includes an unsubstituted and a substituted alkylamino group such as a hydroxy or sulfo-substituted alkylamino group (preferably an alkylamino group or substituted alkylamino group wherein the alkyl moiety has from 1 to 10 carbon atoms, e.g., methylamino, ethylamino, propylamino, dimethylamino, diethylamino, dodecylamino, cyclohexylamino, β-hydroxyethylamino, di-(β-hydroxyethyl)amino, β-sulfoethylamino, etc.), an arylamino group, which term includes an unsubstituted arylamino group and a substituted arylamino group, preferably a substituted arylamino group wherein the substituent is an alkyl group of from about 1 to 4 carbon atoms, a sulfo group, a carboxy group, a hydroxy group. and the like (e.g.. anilino, o-sulfoanilino, m-sulfoanilino, p-sulfoanilino, o-anisylamino, m-anisylamino, p-anisylamino, o-toluidino, m-toluidino, p-toluidino, o-carboxyanilino, m-carboxyanilino, p-carboxyanilino, hydroxyanilino, disulfophenylamino, naphthylamino, sulfonaphthylamino, etc.), a heterocycloamino group (e.g., 2-benzothiazolylamino, 2-pyridyl-amino, etc.), an aryl group (e.g., phenyl, etc.), or a mercapto group, where $R^1$, $R_2$, $R_3$ and $R_4$ may each be the same as or different from one another.

Also according to formula (III), A represents a divalent aromatic residue, preferably comprising 1 to 4 aromatic rings. Such residues are known in the art and are described, for example, in U.S. Pat. Nos. 4,199,360, the disclosure of which is incorporated herein by reference. Examples of such divalent aromatic residues include:

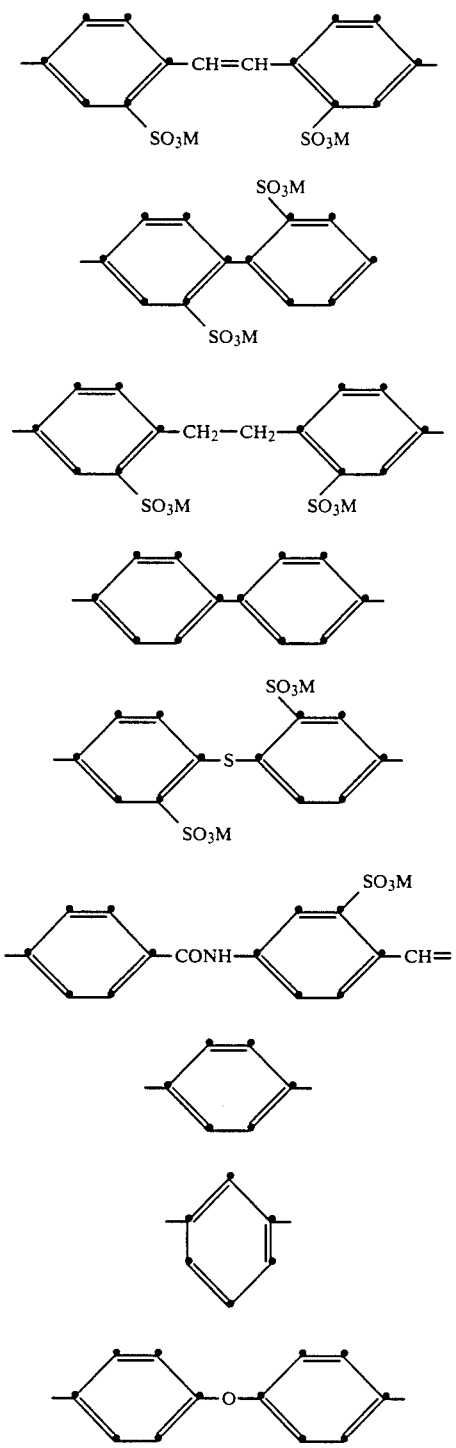

-continued
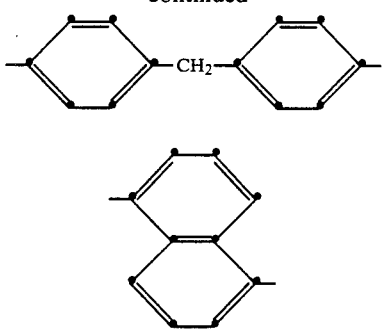
where M represents hydrogen or a cation (preferably an alkali metal, e.g., sodium, potassium, etc or an ammonium group).
In a preferred embodiment, the divalent aromatic residue represented by A is a stilbene. One such stilbene is represented by the formula:
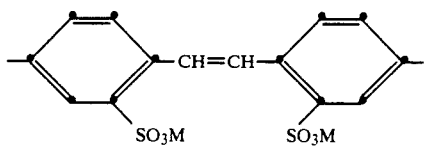
Specific examples of bis-azine compounds according to formula (III) include:
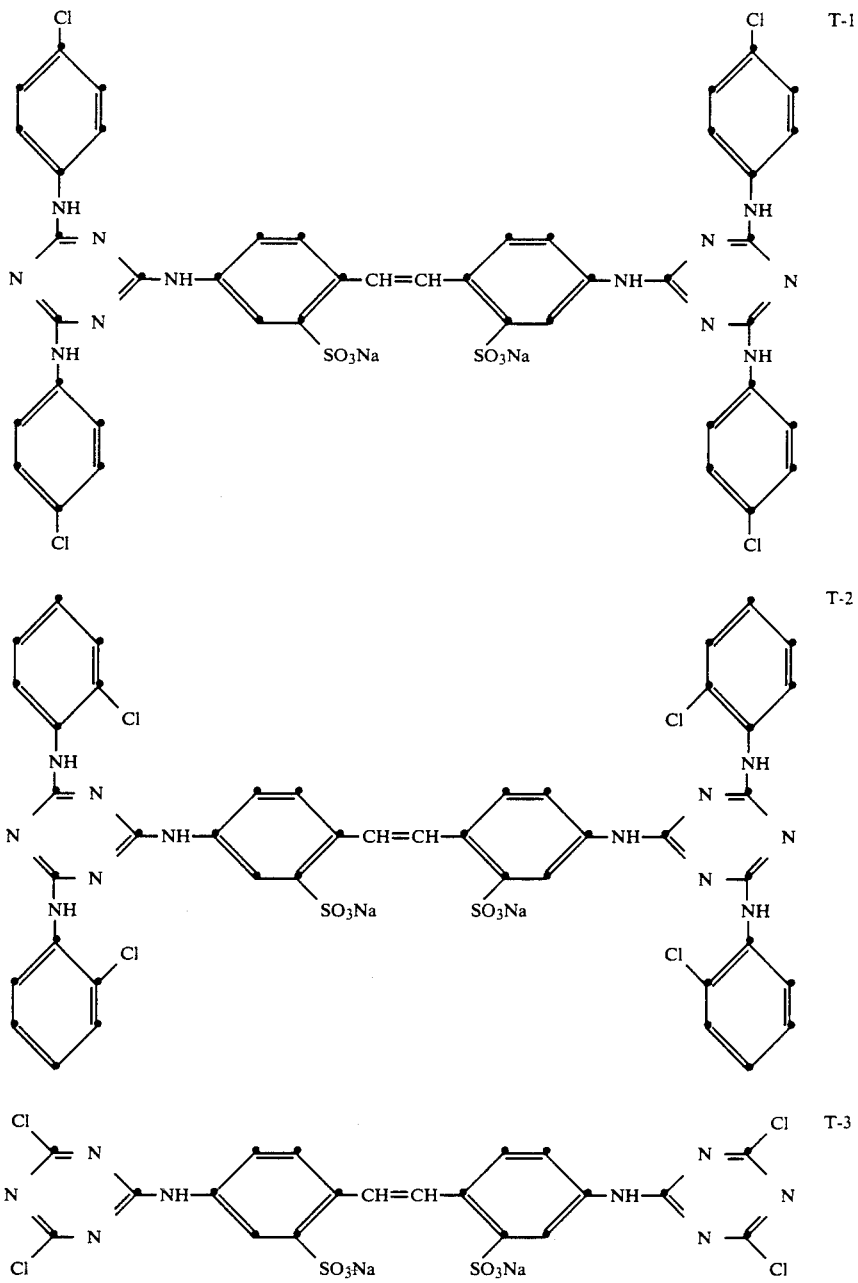

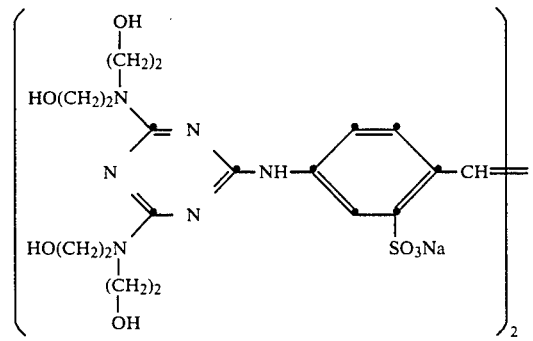

T-4

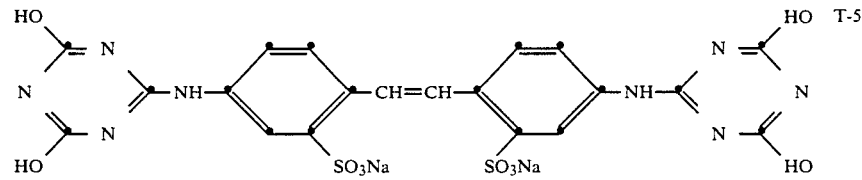

T-5

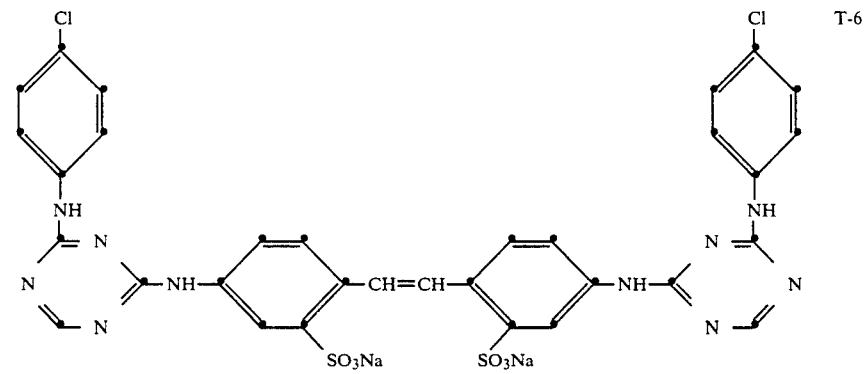

T-6

The optimum amount of the bis-azine compound will vary with factors such as the performance criteria of the photographic element, the processing conditions to be used, the type of emulsion, and the particular sensitizing dye. The bis-azine can be added to the emulsion melt or in other phases of silver halide emulsion preparation, such as during chemical sensitization. Useful amounts of the bis-azine compound preferably include from about 0.1 to about 100 moles/mole dye, although smaller amounts may also be useful depending on factors such as those identified above. Mixtures of different bis-azines can also be used.

The emulsion can also include any of the addenda known to be useful in photographic emulsions. These include chemical sensitizers, such as active gelatin, sulfur, selenium, tellurium, gold, platinum, palladium, iridium, osmium, rhenium, Phosphorous, or combinations thereof. Chemical sensitization is generally carried out at pAg levels of from 5 to 10, pH levels of from 5 to 8, and temperatures of from 30° to 80° C., as illustrated in Research Disclosure, June, 1975, item 13452 and U.S. Pat. No. 3,772,031.

Other addenda include brighteners, antifoggants, stabilizers, filter dyes, light absorbing or reflecting pigments, vehicle hardeners such as gelatin hardeners, coating aids, dye-forming couplers, and development modifiers such as development inhibitor releasing couplers, timed development inhibitor releasing couplers, and bleach accelerators. These addenda and methods of their inclusion in emulsion and other photographic layers are well known in the art and are disclosed in Research Disclosure I and the references cited therein.

The emulsion layer containing silver halide sensitized with the dye of the invention can be coated simultaneously or sequentially with other emulsion layers, subbing layers, filter dye laters, or interlayers or overcoat layers, all of which may contain various addenda known to be included in photographic elements. These include antifoggants, oxidized developer scavengers. DIR couplers, antistatic agents, optical brighteners, light-absorbing or light-scattering pigments, and the like.

The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

The photographic element of the invention can be black and white or color. Since the photographic element of the invention is sensitive to infrared radiation, which is invisible to the human eye. a color element would be a false color sensitized element, with one or more infrared-sensitive layers having one or more dye-forming couplers associated therewith. Such an element is described, for example, in U.S. Pat. No. 4,619,892. Color dye-forming couplers and the various addenda associated therewith are well-known in the art and are described, for example, in *Research Disclosure I*, Section VII, and the references cited therein.

The invention is further described in the following examples.

SYNTHESIS EXAMPLE 1

Step A

Preparation of 3-phenyl-2,4-trimethylene glutacondialdehydedianil hydrochloride

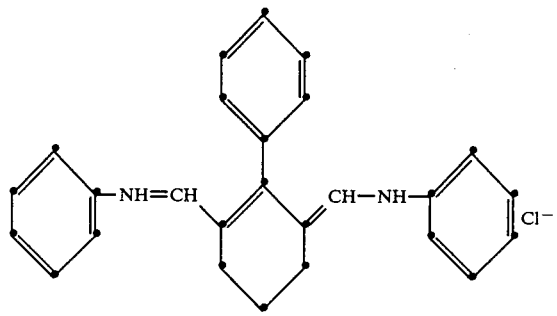

Ethylformanilide (60 g, 0.40 mol) was dissolved in 50 mL of chloroform and cooled to 0° C. with stirring. Phosphorous oxychloride (55 g, 0.36 mol) was added dropwise over a 0.5 hr. period while maintaining the temperature at 0° C. After stirring one additional hour at 0° C., 1-phenyl-1-cyclohexene (19 g, 0.12 mol) was added dropwise and the mixture was heated at 45° C. overnight. The reaction mixture was transferred to a 1 L beaker and with stirring, Potassium carbonate (5 g) in 400 mL of water was added slowly and then 40 g of potassium carbonate was added portionwise. Aniline hydrochloride in 50 mL of water was then added followed by 40 g of potassium carbonate. After cooling, the solid formed was collected and recrystallized from aqueous ethanol affording 20 g (41% yield) of product.

Step B

Preparation of 3,3'-diethyl-5,5'6,6'-tetra-methylthio-11-phenyl-10,12-trimethylenebenzothiazolotricarbocyanine tetrafluoroborate thyleneglutacondialdehydedianil hydrochloride (1 g, 2.5 mmol), triethylamine (5 mL) were combined in 20 mL of pyridine and heated at reflux for 5 min. Excess tetrabutylammonium tetrafluoroborate was added and the solution was allowed to cool, 5 mL of water was added and the solid product was collected and washed with ethanol. The product was recrystallized from aqueous pyridine affording 0.4 g (19% yield) of dye, λ-max=818 nm (MeOH), ε-max=27.37×10⁴.

SYNTHESIS EXAMPLE 2

Step A

Preparation of 3-methyl-2,4-trimethyleneglutacondialdehydedianil hydrochloride

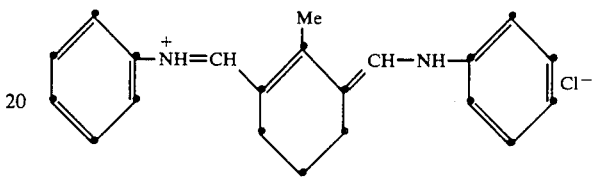

Ethylformanilide (60 g, 0.4 mol), was dissolved in 50 mL of chloroform and cooled to 0° C. with stirring. Phosphorous oxychloride (55 g, 0.36 mol) was added dropwise over a 0.5 hr. period while maintaining the temperature at 0° C. The reaction mixture was then allowed to warm to room temperature and stirred for 1 hr. 1-Methyl-1-cyclohexene (11.4 g, 0.12 mol) was added and the mixture was heated at 45° C. overnight with stirring. The mixture was transferred to a 1 L beaker and potassium carbonate solution (5.0 g in 100 mL of water) was added carefully with rapid stirring. An additional portion (35 g) of solid potassium carbonate was carefully added and then aniline hydrochloride (46 g, 0.36 mol) dissolved in 50 mL of water was added and the mixture was stirred for 0.5 hr. After carefully adding 40 g of solid potassium carbonate the reaction mixture was cooled to room temperature and the product was collected, stirred with 200 mL of water, collected again and dried (20 g, 50% yield).

Step B

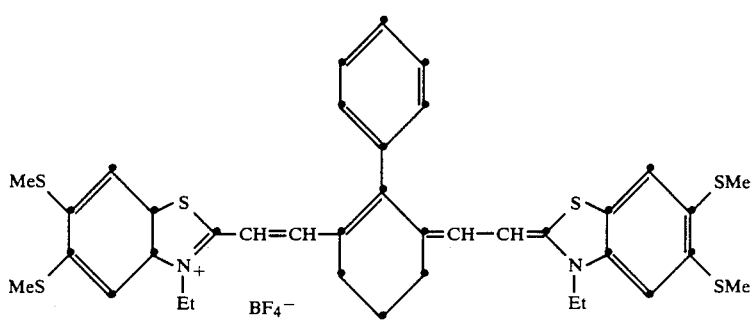

3-Ethyl-2-methyl5,6-dimethylthiobenzo thiazolium toluenesulfonate (2.2 g, 5 mmol), 3-phenyl-2,4-trime- Preparation of 3,3',11-trimethyl-10,12-trimethylenebenzothiazolotricarbocyanine tetrafluoroborate

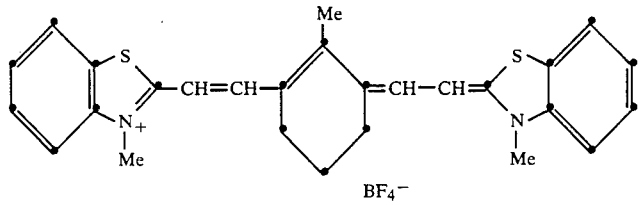

3Methyl-2,4-trimethyleneglutacondialdehydedianil hydrochloride (0.5 g, 1.5 mmol) and 2,3-dimethylbenzothiazolium p-toluenesulfonate (1.05 g, 3.0 mmol) were combined in 20 mL of ethanol and heated until a solution was obtained. Triethylamine (5 g, 50 mmol) was added and the mixture was refluxed for 5 min. After cooling the solid formed was collected (0.4 g) and dissolved in 20 mL of hot acetic acid and filtered. A solution of tetrabutylammonium tetrafluoroborate (1.0 g, 3.0 mmol) in 5 mL of acetic acid was added and the mixture was heated to reflux and allowed to cool. This afforded 0.25 g (16% yield) of dye, $\lambda$-max=784 nm, $\epsilon$-max=$19.95\times10^4$.

SYNTHESIS EXAMPLE 3

Preparation cf 3,3'-diethyl-11-methyl-5,5',6,6'-tetramethylthio-10,12-trimethylenebenzothiazolotricarbocyanine tetrafluoroborate

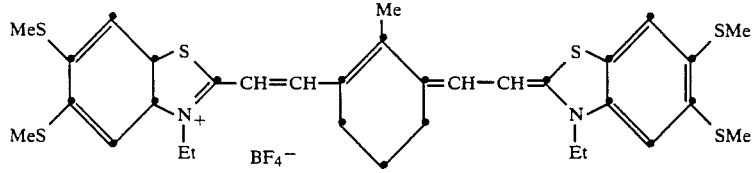

3-Ethyl-2-methyl-5,6-dimethylthiobenzothiazolium toluenesulfonate (2.2 g, 5 mmol), 3-methyl-2,4-trimethyleneglutacondialdehydedianil hydrochloride (0.88 g. 2.5 mmol) and triethylamine (5 g) were combined in 20 mL of ethanol at reflux for 5 min. The mixture was cooled and the product was collected. The dye was dissolved in aqueous pyridine and excess tetrabutylammonium tetrafluoroborate was added. The precipitated dye was collected and dried. This afforded 0.6 g (31% yield) of dye, $\lambda$-max=824 nm (MeCN), $\epsilon$-max=$20.2\times10^4$.

EXAMPLE 1

Photographic evaluation was carried out in the following photographic element, coated on polyethylene coated paper support which had been previously overcoated with a layer containing 10.8 mg gelatin/dm2: The imaging layer contained a sulfur plus gold sensitized pure silver chloride emulsion (0.35um), coated at 1.8 mg Ag/dm2, gelatin at 16.6 mg/dm2, and cyan forming coupler (structure A) at 4.5 mg/dm2. The emulsion was doctored with 500 mg/mole Ag of the supersensitizer (structure T 2), 450 mg/mole Ag of the antifoggant 1-(3-acetamidophenyl)-5-mercaptotetrazole sodium salt, and 1 mole percent of potassium bromide. Dyes according to the invention or comparison dyes (identified by the letter "C") were added to the emulsion at 0.03 millimoles/mole Ag. The imaging layer was simultaneously overcoated with a layer containing 10.8 mg gelatin/dm2

To determine broad band speed, the coatings were exposed to a 2850° K. tungsten lamp filtered through a Kodak Wratten ® filter number 9 and a step wedge ranging in density from 0 to 3 density units in 0.15 steps. ExPosure times were 0.1 second. Processing was done through a standard Kodak EP-2 ® process. Speeds were determined at a density of 1.0.

To determine the wavelength of maximum sPectral sensitization, $\lambda$-max, the coatings were given 4 sec exposures on a wedge sPectrographic instrument which covers the wavelength range from 400 to 850 nm. The instrument contains a tungsten light source and a step tablet ranging in density from 0 to 3 density units in 0.3 density steps. After processing through a standard Kodak EP -2 ® process, speed is read at 10 nm wavelength intervals at a density of 0.9 above fog. Correction for the instrument's variation in spectral irradiance with wavelength is done via computer and the wavelength of maximum spectral sensitivity is read from the resulting plot of log relative spectral sensitivity vs wavelength. The speed at $\lambda$-max is reported in Table I.

For dyes with sensitivity maxima beyond 850 nm, the wavelength of maximum sensitivity was determined using a series of 2 sec exposures from a 2850° K. tungsten lamp filtered through interference filters ranging in wavelength from 850 to 900 nm in 10 nm increments and a step wedge ranging in density from 0 to 3 density units in 0.15 density steps. After processing through a standard Kodak EP -2 process, speeds were read at a density of 1.0. After correction for the variation in spectral irradiance through the filters, a plot of spectral sensitivity vs wavelength was made and used to determine the wavelength of maximum spectral sensitivity.

The width of spectral sensitivity distribution was determined from the plots of spectral sensitivity vs. wavelength described above by determining the two wavelengths for which the spectral sensitivity decreased by 0.1 log E compared to the sensitivity at $\lambda$-max. The spectral width, which is reported in Table I, is the difference between these two wavelengths.

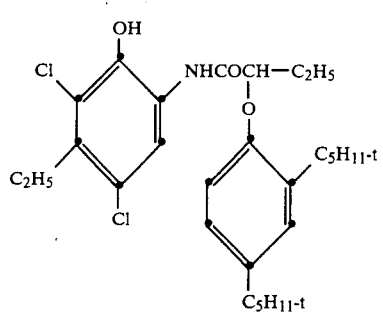
Structure A
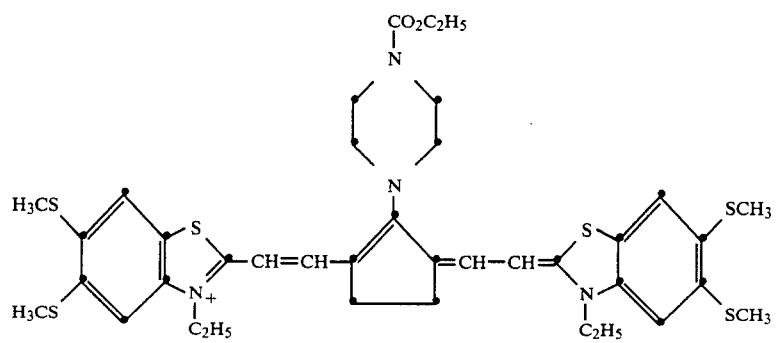
C-1
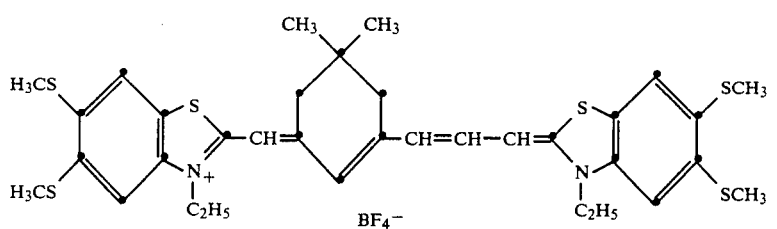
C-2
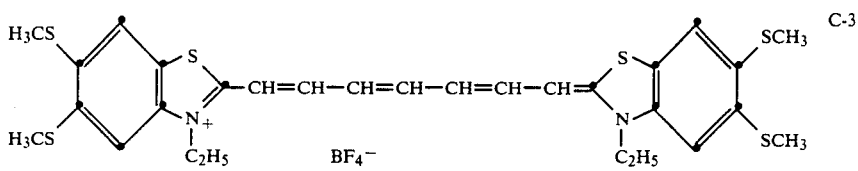
C-3
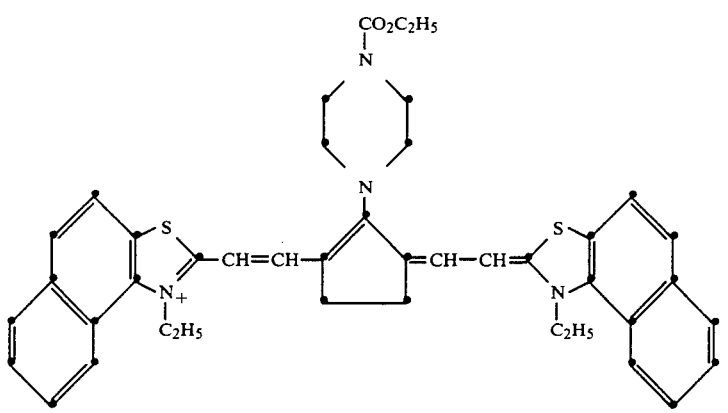
C-4

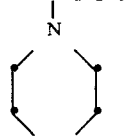
C-5

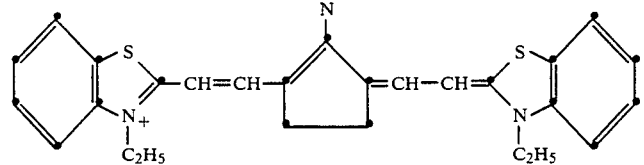

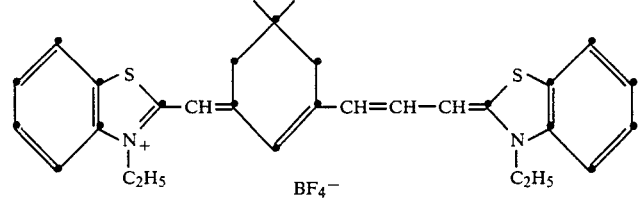
C-6

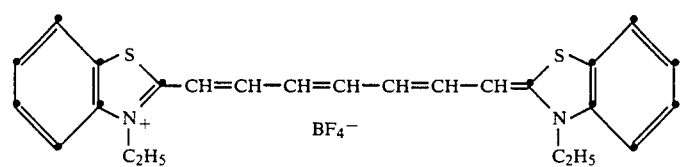
C-7

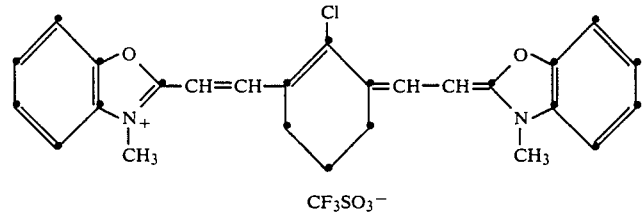
C-8

TABLE I

| Dye | λ-max (nm) | Broad-band Speed | Fog | Spectral Width (nm) | Change After 3 mon. at 78° F./50% R.H. Speed | Fog |
|---|---|---|---|---|---|---|
| 1 | 870 | 1.04 | 0.11 | 25 | +0.00 | +0.02 |
| 2 | 860 | 1.39 | 0.11 | 20 | −0.06 | +0.03 |
| C-1 | 800 | 1.69 | 0.16 | 80 | +0.05 | +0.02 |
| C-2 | 850 | 1.42 | 0.12 | 37 | −0.12 | +0.01 |
| C-3 | 860 | 1.17 | 0.11 | 40 | −0.17 | 0.00 |
| 3 | 885 | 0.72 | 0.11 | 30 | −0.04 | +0.02 |
| 4 | 865 | 0.67 | 0.12 | 30 | −0.05 | +0.05 |
| C-4 | 840 | 1.11 | 0.12 | >45 | +0.10 | +0.02 |
| 5 | 850 | 1.11 | 0.11 | 30 | −0.02 | +0.03 |
| 6 | 835 | 0.91 | 0.12 | 30 | −0.05 | +0.03 |
| 7 | 830 | 1.55 | 0.12 | 35 | −0.05 | +0.04 |
| C-5 | 790 | 1.64 | 0.15 | 60 | 0 | +0.03 |
| C-6 | 820 | 1.66 | 0.12 | 40 | −0.16 | +0.01 |
| C-7 | 820 | 1.65 | 0.12 | 36 | −0.17 | +0.01 |

The dyes of the present invention have substantially narrower spectral width and deeper λ-max than the comparison dyes (C-1, C-4, C-5) with an alternate type of symmetrically-placed bridging in the chain. When compared to dyes with an unsymmetrically placed bridge (C-2, C-6) or when compared to dyes with no bridging in the chain (C-3, C-7), the present dyes have a somewhat narrower spectral width and substantially better keeping stability.

EXAMPLE 2

Photographic evaluation was also carried out in the following black and white photographic element, coated on acetate support: The imaging layer contained a 0.2 μm cubic AgBrI emulsion chemically sensitized with sulfur and gold, coated at 10.8 mg Ag/dm2, with gelatin at 73.4 mg/dm2. The emulsion was doctored with 500 mg/mole Ag of the supersensitizer [structure T-2] and 1 gm/mole of a tetraazaindene. Dyes were added to the emulsion at 0.2 millimoles/mole Ag or 0.6 millimoles/mole Ag. The wavelength of maximum sensitivity for the dyes and the speed at λ-max was determined using 1 sec exposures on the same wedge spectrographic instrument described in Example 1. The degree of desensitization by the dyes was determined by comparing the speed at 400 nm for the dyed coatings as measured with this wedge spectrographic exposure to the speed at 400 nm of an undyed coating. This difference in speed, labelled Δ400, gives the desensitization. Data for the Dye 12 and comparison Dyes C-8, C-9, and C-10 are given in Table II. Dyes C-9 and C-10 are dyes according to formula (I) except that they have a heterocyclic $R_3$ with a carbonyl in the beta position to the methine chain carbon atom, such as the dyes described in U.S. Pat. No. 2,955,939.

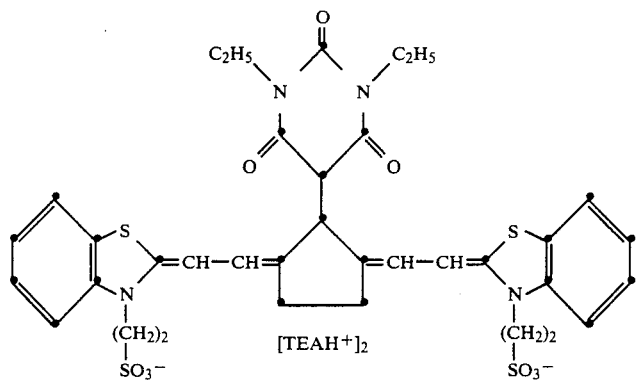

C-9

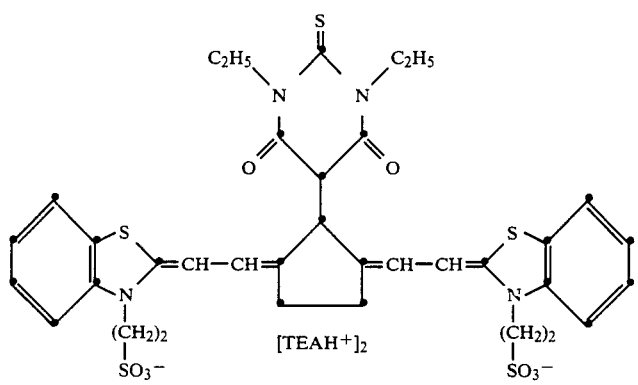

C-10

TABLE II

| Dye | Dye Conc | Peak (nm) | Log Relative Spectral Sensitivity | Δ 400 |
|---|---|---|---|---|
| 12 | $2 \times 10^{-5}$ | 770 | 1.57 | +.33 |
| | $6 \times 10^{-5}$ | 770 | 1.63 | +.34 |
| C-8 | $2 \times 10^{-5}$ | 780 | 1.45 | +.17 |
| | $6 \times 10^{-5}$ | 780 | 1.23 | −.06 |
| C-9 | $2 \times 10^{-5}$ | | no sensitivity in infrared | −.04 |
| C-9 | $6 \times 10^{-5}$ | | no sensitivity in infrared | −.12 |
| C-10 | $2 \times 10^{-5}$ | | no sensitivity in infrared | −.24 |
| C-10 | $6 \times 10^{-5}$ | | no sensitivity in infrared | −.59 |

The data in Table II show that dye 12 gives better speed at its wavelength of maximum sensitivity and less densensitization in the region of the instrinsic silver halide sensitivity than the comparison dye C-8. Comparison dyes C-9 and C-10 failed to spectrally sensitize the emulsion in the infrared, and also caused desensitization.

The invention has been described in detail with particular reference to preferred embodiments thereof, but it will be understood that variations and modifications can be effected within the spirit and scope of the invention.

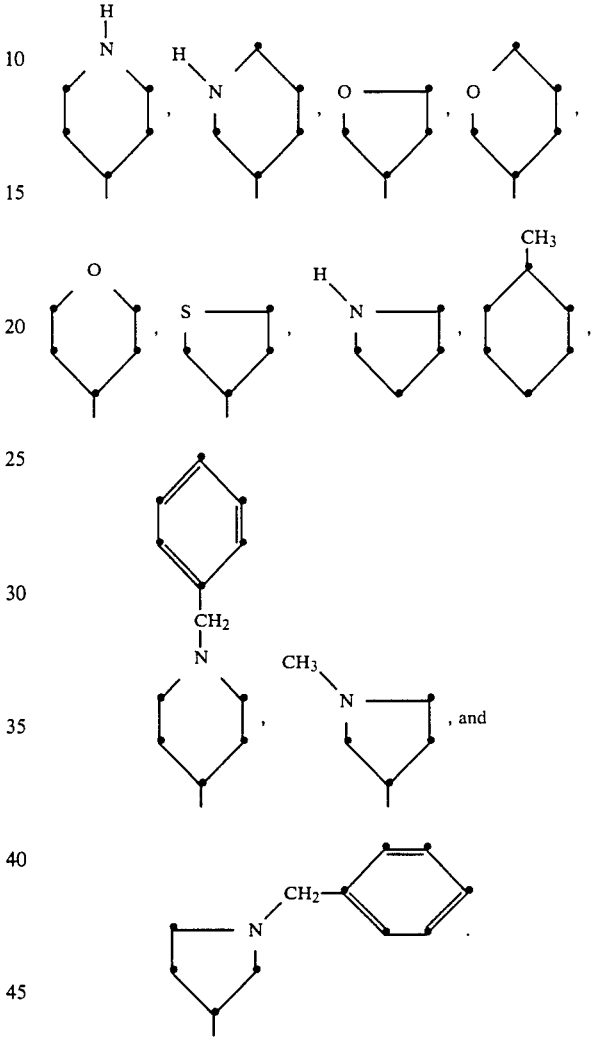

What is claimed is:

1. A photographic element comprising a support having thereon a silver halide emulsion layer comprising silver halide sensitized with a dye having the formula:

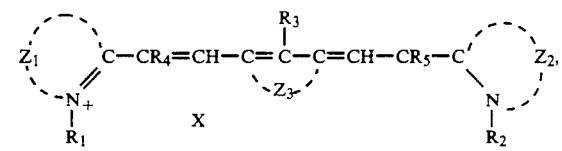

$Z_1$ and $Z_2$ each independently represents the atoms necessary to complete a substituted or unsubstituted thiazole nucleus, a substituted or unsubstituted oxazole nucleus, a substituted or unsubstituted selenazole nucleus, a substituted or unsubstituted quinoline nucleus, a substituted or unsubstituted tellurazole nucleus, or a substituted or unsubstituted pyridine nucleus, $Z_3$ represents the atoms that complete a 6-membered carbocyclic ring, $R_1$ represents substituted or unsubstituted alkyl, substituted or unsubstituted aryl, or, together with $R_4$, forms a ring structure, $R_2$ represents substituted or unsubstituted alkyl, substituted or unsubstituted aryl, or, together with $R_5$, forms a ring structure, $R_3$ represents substituted or unsubstituted alkyl, substituted or unsubstituted aryl, or a substituted or unsubstituted heterocyclic or carbocyclic ring wherein said ring does not have a heteroatom attached directly to the methine chain carbon atom of the dye and does not have a carbonyl in the beta position to the methine chain carbon atom of the dye, $R_4$ represents hydrogen or, together with $R_1$, forms a ring structure, $R_5$ represents hydrogen or, together with $R_2$, forms a ring structure, and X is a counterion as needed to balance the charge of the molecule, and a compound having the formula:

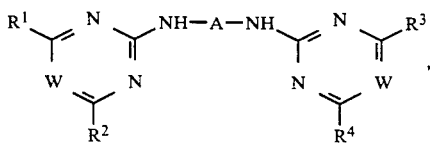

R$^1$, R$^2$, R$^3$, and R$^4$ each independently represents halogen, hydroxy, alkoxy, aryloxy, arylthio, aryl, amino, alkylamino, arylamino, or aralkylamino, —A— is a divalent aromatic residue, and W is nitrogen or $=CR^5—$ where R$^5$ is hydrogen, alkyl, or halogen.

2. A photographic element according to claim 1 wherein $Z_1$ and $Z_2$ each independently represents the atoms necessary to complete a substituted or unsubstituted: thiazole nucleus, oxazole nucleus, or selenazole nucleus.

3. A photographic element according to claim 2 wherein $Z_1$ and $Z_2$ each independently represents the atoms necessary to complete a substituted or unsubstituted benzothiazole nucleus.

4. A photographic element according to any of claims 1-3 wherein R$_3$ represents a heterocyclic or carbocyclic ring wherein said ring does not have a heteroatom attached directly to the methine chain carbon atom of the dye and does not have a carbonyl in the beta position to the methine chain carbon atom of the dye.

5. A photographic element according to any of claims 1-3 wherein R$_3$ is substituted or unsubstituted alkyl or aryl.

6. A photographic element accoridng to any of claims 1-3 wherein R$_3$ is methyl or phenyl.

7. A photographic element according to any of claims 1-3, further comprising at least one additional silver halide emulsion layer sensitive to infrared radiation and having a maximum sensitivity that is different from the first silver halide emulsion layer.

8. A photographic element according to claim 4, further comprising at least one additional silver halide emulsion layer sensitive to infrared radiation and having a maximum sensitivity that is different from the first silver halide emulsion layer.

9. A photographic element according to claim 1 wherein R$_3$ is selected from the group consisting of substituted or unsubstituted: 4-pyridyl, 3-pyridyl, 2-thienyl, 3-thienyl,